US008474029B2

(12) United States Patent
Adams et al.

(10) Patent No.: US 8,474,029 B2
(45) Date of Patent: *Jun. 25, 2013

(54) METHOD AND SYSTEM OF USER AUTHENTICATION USING A PORTABLE AUTHENTICATOR

(75) Inventors: Neil Patrick Adams, Waterloo (CA); David Francis Tapuska, Waterloo (CA); Michael Stephen Brown, Kitchener (CA); Herbert Anthony Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/423,966

(22) Filed: Mar. 19, 2012

(65) Prior Publication Data

US 2012/0233681 A1 Sep. 13, 2012

Related U.S. Application Data

(63) Continuation of application No. 10/819,278, filed on Apr. 7, 2004, now Pat. No. 8,166,530.

(30) Foreign Application Priority Data

Apr. 7, 2003 (GB) .................................. 0308010.8

(51) Int. Cl.
G06F 7/04 (2006.01)
G06F 12/14 (2006.01)
G06F 21/00 (2006.01)

(52) U.S. Cl.
USPC .................................. 726/9; 726/20; 713/185

(58) Field of Classification Search
None
See application file for complete search history.

(56) References Cited

U.S. PATENT DOCUMENTS

| 5,485,519 | A | 1/1996 | Weiss |
| 5,497,411 | A | 3/1996 | Pellerin |
| 5,515,440 | A | 5/1996 | Mooney et al. |
| 5,544,246 | A | 8/1996 | Mandelbaum et al. |
| 5,774,551 | A | 6/1998 | Wu et al. |
| 6,226,744 | B1 | 5/2001 | Murphy et al. |
| 6,259,769 | B1 | 7/2001 | Page et al. |
| 6,362,893 | B1 | 3/2002 | Francis et al. |

(Continued)

FOREIGN PATENT DOCUMENTS

| EP | 0607767 | 7/1994 |
| EP | 1039769 | 9/2000 |
| EP | 1061755 | 12/2000 |
| WO | 03005687 | 1/2003 |

OTHER PUBLICATIONS

Ghayour, Mehdi, Fourth Office Action for CA 2,463,379, Sep. 6, 2012.

(Continued)

*Primary Examiner* — Philip Chea
*Assistant Examiner* — Fatoumata Traore
(74) *Attorney, Agent, or Firm* — Integral Intellectual Property Inc.; Miriam Paton

(57) ABSTRACT

Systems and methods are provided for facilitating access to an electronic device. Password information is stored on the electronic device, and on a portable authenticator. When a user attempts to access the electronic device, the user is prompted to enter a password at the electronic device. The portable authenticator determines the validity of the entered password. The electronic device receives the results of the validity determination from the portable authenticator, and provides access to the electronic device based on the received validity determination.

29 Claims, 9 Drawing Sheets

U.S. PATENT DOCUMENTS

| | | | |
|---|---|---|---|
| 7,362,869 | B2 | 4/2008 | Landrock |
| RE41,716 | E | 9/2010 | Fernando et al. |
| 2002/0091931 | A1 | 7/2002 | Quick, Jr. et al. |
| 2002/0169989 | A1 | 11/2002 | Chen |
| 2003/0046551 | A1 | 3/2003 | Brennan |
| 2003/0088780 | A1 | 5/2003 | Kuo et al. |
| 2004/0052405 | A1 | 3/2004 | Walfridsson |

OTHER PUBLICATIONS

Fruru, Tycho, Extended European Search Report for EP 04252070.0, Aug. 22, 2006.

Fruru, Tycho, Extended European Search Report for EP 08166498.9, Feb. 12, 2009.

Fruru, Tycho, Search Report for EP 04252070.0, Mar. 30, 2006.

Fruru, Tycho, Third Exam Report for EP 04252070.0, Jul. 11, 2007.

Shreih, Raghid, First Office Action for CA 2,463,379, Nov. 5, 2008.

Shreih, Raghid, Second Office Action for CA 2,463,379, Jul. 29, 2009.

Shreih, Raghid, Third office Action for CA 2,463,379, Jan. 11, 2011.

Sigolo, Alessandro, Third Exam Report for EP 08166498.9, Sep. 28, 2011.

Sun Microsystems, Inc., Solaris Smartcard Administration Guide, online, May 2002, XP007900189, p. 22-p. 23.

V. Samar and R. Schemers, OSF-RFC 86/0: Unified Login with Pluggable Authentication Modules (PAM), Oct. 1995, Open Software Foundation, XP007900201, p. 2.

METHOD AND SYSTEM OF USER AUTHENTICATION USING A PORTABLE AUTHENTICATOR

CROSS-REFERENCE TO RELATED APPLICATIONS

This application is a continuation of U.S. application Ser. No. 10/819,278 filed Apr. 7, 2004, which claims priority from GB Application No. 03080108 filed Apr. 7, 2003, the contents of both of which are incorporated herein by reference.

TECHNICAL FIELD

This application relates generally to electronic devices, and in particular, to supporting portable authenticators on electronic devices.

BACKGROUND

In a corporate environment, employees are provided with access to office supplies and equipment to be used in performing job functions. Standard equipment in a modern workplace includes at least a personal computer (PC), and often also includes a wireless mobile communication device and other types of electronic devices. Fixed electronic devices such as desktop PCs are typically both physically secured at a corporate office and "logically" secured in accordance with an access control scheme. Although mobile electronic devices ("mobile devices"), by their nature, are much more difficult to physically secure, access control schemes based on security passwords, passphrases, or access codes, for example, are often used to logically secure such devices.

Portable authenticators, such as smart cards, are becoming common in environments where a higher degree of security is desired. Smart cards are used to store, and possibly also process, information. Smart cards and other portable authenticators which store information enable enhanced access control schemes based on two-factor authentication, in which a first authentication factor is something a user knows, such as a security password, and a second authentication factor is something the user has (the smart card). Where a cryptographic key is stored on a smart card or authenticator, reliable key distribution for secure communications and data storage functions is also enabled. Storing a private or secret cryptographic key on a smart card enhances the security of the key in that the key need not be retrieved directly from a source. Further applications of smart card technology will be apparent to those skilled in the art to which the present application pertains.

In order to extend similar levels of security and functionality to mobile devices, systems and method of supporting portable authenticators, such as smart cards, for such devices are needed.

SUMMARY

According to one aspect of the invention, there is provided a method of facilitating access to an electronic device with a portable authenticator, that involves the steps of (1) detecting an attempt to access the electronic device; (2) in response to the step of detecting, prompting a user to enter a password at the electronic device; (3) determining a validity of the entered password at the portable authenticator; (4) at the electronic device, receiving the validity determination from the portable authenticator; and (5) providing access to the electronic device in accordance with the received validity determination.

According to another aspect of the invention, there is provided an electronic device that includes an interface for effecting communication with a portable authenticator; and processing means configured for communication with the interface. The processing means is also configured to: (a) detect an attempt to access the electronic device; (b) in response to the detection, prompt a user to enter a password at the electronic device; (c) transmit the entered password to the portable authenticator for a validity determination thereof; (d) receive the validity determination from the portable authenticator; and (e) provide access to the electronic device in accordance with the validity determination.

In an implementation of the invention, the electronic device includes a memory storing an electronic device password thereon, and the portable authenticator includes a memory storing an auxiliary password. Preferably, the portable authenticator comprises a SmartCard.

The processing means is disposed within a housing, and the interface is disposed within a cradle configured for supporting the housing. The cradle also includes means for communicating with the processing means. In an alternate embodiment, the processing means is disposed within a housing, and the interface is physically integrated with the housing.

In one embodiment, upon detecting the presence of the portable authenticator, the processing means prompts the user for a password, and then transmits the entered password to the portable authenticator in accordance with a match between the entered password and the electronic device password stored in the electronic device memory. The portable authenticator determines the validity of the entered password by checking the entered password against the auxiliary password stored in the portable authenticator memory.

In another embodiment, upon detecting the presence of the portable authenticator, the processing means prompts the user for an electronic device password and an auxiliary password, and then transmits the entered auxiliary password to the portable authenticator in accordance with a match between the entered electronic device password and the stored electronic device password. Alternately, in one variation, the processing means transmits the entered auxiliary password to the portable authenticator in accordance with a failure of the entered electronic device password to match the stored electronic device password.

In one variant of the foregoing embodiments, the processing means continues to provide the user with access to the electronic device after the portable authenticator has been removed from communication with the electronic device, whereas in another variant, the processing means terminates the user's access to the electronic device after the portable authenticator has been removed from communication with the electronic device.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DETAILED DESCRIPTION

Figure 1:
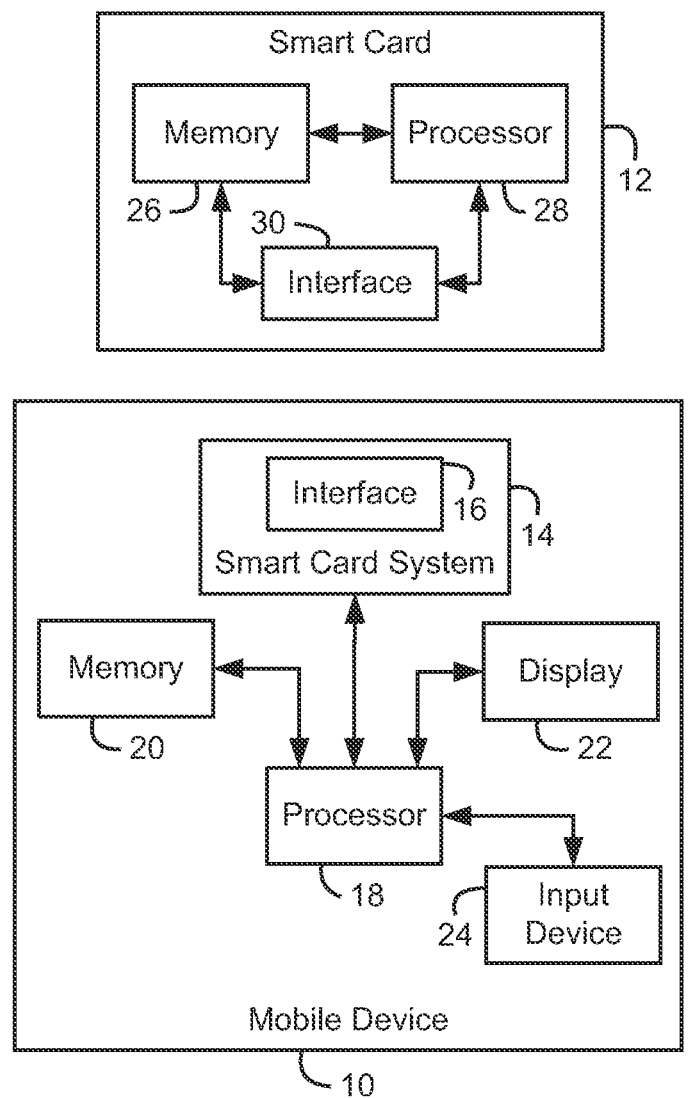
FIG. 1 is a block diagram of a system of supporting smart cards for a mobile device.

FIG. 1 is a block diagram of a system of supporting smart cards for a mobile device. The smart card 12 is an example of a portable authenticator used in conjunction with the mobile device 10.

The mobile device 10 includes a smart card system 14, a processor 18, a memory 20, a display 22, and an input device 24. The block diagram in FIG. 1 shows only those components of the mobile device 10 involved in smart card operations. Mobile devices that support smart cards may include further, fewer, or different components than those shown in FIG. 1. One such exemplary mobile device is described in further detail below with reference to FIG. 9.

The processor 18 controls overall operation of the mobile device 10, and executes operating system software and a plurality of software applications. Security functions for the mobile device 10, such as device password protection, secure information access, and the like, are also supported by either the operating system software or software applications. Support for interaction with the smart card 12 through the smart card system 14 as described in further detail below is enabled in the operating system software, one or more software applications, or both the operating system software and software applications.

The memory 20 stores operating system software, software applications, and a plurality of types of information, typically including private or confidential information. Information stored in the memory 20 often includes data files, personal information manager (PIM) data, calendar appointments, to do lists, and, where the mobile device is enabled for communications functions, sent and received messages such as email messages. Although shown as a single block in FIG. 1, it should be appreciated that the memory 20 may, and typically does, incorporate different types of memory for different purposes. For example, both volatile and non-volatile memory components, each of read-write or read-only type, are commonly used in mobile devices such as 10.

The display 22 and the input device 24 provide interfaces between a user of the mobile device 10 and the device. Information is displayed to a user on the display 22 and accepted as user input from the input device 24. In a mobile device such as 10, the display 22 is typically a liquid crystal display ("LCD"). Perhaps the most common types of input device 24 in a mobile device are keypads and keyboards, although combined display/input devices are also known.

In operation, the mobile device 10 is preferably configured to provide a plurality of communication and information management functions. Information stored in the memory 20, received at the mobile device 10 via a wireless transceiver (not shown), for example, or input to the mobile device 10 using the input device 24, may be displayed on the display 22, edited, stored to the memory 20 if not already stored, or otherwise processed on the mobile device 10. Some information stored in, received at, or input to the mobile device 10 may be confidential or sensitive information to which access should be restricted. It is also generally desirable to restrict use of a mobile device to an authorized user. As described in further detail below, providing support for smart cards on the mobile device 10 enhances the security of mobile device resources, including not only stored information, but also other functions such as wireless communications, for example.

The smart card 12 includes a memory 26 for storing information. Like the memory 20 in the mobile device 10, the memory 26 may include different types of memory. For example, where the smart card 12 allows a compatible smart card system such as 14 to write information to the memory 26, the memory 26 is or at least includes read-write memory such as Random Access Memory (RAM). Depending on the type of the smart card 12, the memory 26 includes read-only memory, read-write memory, or both.

The smart card processor 28 is configured to execute so-called card operating system (COS) software and software applications. The COS software, and possibly any installed software applications, also provide for execution of various commands. These commands include, for example, memory-related commands to read information from and write information to the memory 26, security-related commands to set or reset a password or personal identification number or to perform authentication operations such as password checking, as well as further commands to perform other smart card functions.

The interface 30 is compatible with the interface 16, and enables exchange of information between the smart card 12 and the mobile device 10. Commands, and preferably further information as described in detail below, are sent from the mobile device 10 to the smart card 12, and information read from the memory 26 and possibly information processed on the smart card 12 is transferred from the smart card 12 to the mobile device 10. The interfaces 16 and 30 thereby provide a bi-directional communication link between the mobile device 10 and the smart card 12.

As those skilled in the art will appreciate, the smart card interface 30 is a contact interface which forms a physical connection with the interface 16, a contactless interface which forms a wireless link with the interface 16, or a dual interface which forms either a physical or wireless link with the interface 16, depending on the type of the interface 16. The present invention is in no way limited to any particular type of interface. In an alternative embodiment of the invention described in further detail below with reference to FIG. 6, the interfaces 16 and 30 are indirectly coupled through an intermediate component or device compatible with both interfaces. In this instance, the interfaces 16 and 30 need not necessarily be compatible with each other.

Access to computer systems and resources connected in a corporate local area network (LAN), for example, is commonly controlled through user accounts and passwords. As described above, physical access to such computer systems is also normally restricted to employees, such that even when a user leaves a computer system unattended, the computer system, its resources, and accessible network resources are available only to another employee. Prevention of unauthorized access to corporate resources is therefore relatively straightforward in such systems. Smart card-based access control further secures corporate resources by restricting their use to holders of a corporate smart card.

When confidential information or other protected resources are accessible using a mobile device, however, maintaining access control is more difficult, especially when an authorized user of the mobile device loses physical control of the device. As long as the mobile device is in the possession of the authorized user, the user has direct control over device functions. In the event that the mobile device becomes accessible to an unauthorized party, the user can no longer restrict access to information stored on the mobile device or to the functions and services supported on the mobile device.

Password protection is one known security mechanism for mobile devices. Once a mobile device is "locked", a password or passphrase must be correctly entered before the mobile device is usable. Known mobile devices are locked either manually by a user or automatically after the mobile device has been idle for a predetermined timeout period or when the mobile device is placed in a storage cradle or carrying holster, for example. Since it is generally easier for an unauthorized party to acquire access to a mobile device than to a physically secured system, a password-protected mobile device is inherently less secure than a password-protected and physically secured system. Smart card-based access control as described herein provides additional security for mobile devices in that an unauthorized user must obtain not only a user's mobile device and the user's password, but also the user's smart card and smart card personal identification number (PIN) or password in order to unlock and use the mobile device.

In accordance with an aspect of the invention, the smart card system 14 detects the presence of the smart card 12 in an operative position relative to the mobile device 10, and handles information exchange between the mobile device 10 and the smart card 12. For example, configuring the smart card system 14 for protocol conversion simplifies implementation of smart card support in the mobile device 10 in that components other than the smart card system 14 need not be configured to communicate using a smart card protocol such as the half-duplex protocol commonly used for exchanging information with smart cards. Where the interfaces 16 and 30 are indirectly coupled through an intermediate device as described in detail below, then the intermediate device may be similarly configured to convert between mobile device and smart card protocols.

When a user attempts to access the mobile device 10, the processor 18 preferably determines whether the smart card 12 has been detected. In one embodiment of the invention, the mobile device 10 incorporates a smart card holder or reader configured to receive the smart card 12 or a portion thereof. The processor 18 preferably monitors or polls the smart card system 14 to determine whether the smart card 12 is detected. Alternatively, the smart card system 14 outputs a detection signal to the processor 18 when the smart card 12 is detected. If the smart card system 14 detects the smart card 12, then the processor 18 performs security operations such as requesting a mobile device password and a smart card password from the user, as described in further detail below.

Smart card support on the mobile device 10 thereby provides enhanced device security. Once unlocked using the smart card 12 and any required passwords or access codes, however, the mobile device 10 is usable until it is locked again. Thus, if an unauthorized party obtains a mobile device 10 while it is in an unlocked state, then the device remains usable. The risk of, or at least the opportunity for, such unauthorized use of an unlocked mobile device is typically reduced by enabling a security timeout period on the mobile device 10. The mobile device 10 is automatically locked after it remains idle for the duration of the security timeout period. Although the security timeout period provides a backup security measure when a user forgets to lock the mobile device, the mobile device is usable until the security timeout period expires. The security timeout period is normally configurable by a manufacturer, user, or owner of a mobile device.

In the mobile device 10, smart card support further secures the mobile device against such so-called "pickpocket" attacks. According to a further aspect of the present invention, the smart card system 14 is configured to detect removal of the smart card 12 from the operative position while the mobile device 10 is unlocked. The smart card system 14 outputs a smart card removal detection signal or a state change signal, for example, when the smart card 12 is removed from the operative position, or is monitored or periodically polled by the processor 18 to ensure that the smart card 12 has not been removed. Generally, a removal detection signal or substantially continuous monitoring of the smart card system 14 is preferred over periodic polling to provide the most timely determination by the processor 18 that the smart card 12 has been removed from its operative position.

If the smart card 12 is removed while the mobile device 10 is unlocked, then the processor 16 activates one or more security functions. The particular security functions activated are preferably configurable by a manufacturer, user, or owner of the mobile device 10. An owner of the mobile device 10 may be the user, when the mobile device 10 is purchased by the user for personal use, but where the mobile device 10 is provided to the user by an employer, for example, the owner is the employer, not the user.

If information is being displayed on the display 22 when removal of the smart card 12 is detected, then a security function to clear the information from the display 22 is preferably activated. Where the displayed information is a decrypted version of encrypted information, such as an encrypted email message or confidential information stored in the memory 20 in encrypted form, for example, then a further preferable security function is to remove from the memory 20 any part of the encrypted information that had been decrypted and stored while the mobile device 10 was unlocked. In order to display the information again, the mobile device 10 must again be unlocked. Information stored in a controlled-access area of the memory 20 could be similarly secured by activating the above security functions when the smart card 12 is removed. Such security functions protect information and resources available on the mobile device 10 as soon as the smart card 12 is removed. Information on the mobile device is protected as soon as a user removes the smart card 12. The user is not required to manually activate the security functions, and no timeout period must expire before security functions are activated.

Another potentially valuable security function is recovering memory space that was used to store information that has since been deleted. On systems and devices enabled for Java™, for example, this is generally referred to as "garbage collection". In many known memory systems, deletion of information involves discarding of pointers used to access the information, without actually erasing the stored information. These discarded pointers can then be collected and re-used to store new information. Thus, even though a user has "deleted" information, the information may remain in memory until it is over-written with new information. When the mobile device 10 is enabled for storing, receiving, or otherwise accessing confidential information, secure garbage collection, in which random or predetermined data is written into memory areas corresponding to discarded pointers, is preferred. This security function, when activated upon removal of the smart card 12 from the mobile device 10, ensures that deleted information does not remain in memory after the smart card 12 has been removed. If the mobile device 10 is lost or stolen after the smart card 12 has been removed, then previously deleted confidential information cannot be accessed even by disassembling the device and accessing the memory 20 directly.

Therefore, the mobile device 10, or at least particular information stored on the device or functions or services supported on the device, are protected when the smart card 12 is removed. Although this type of security function execution upon removal of the smart card 12 provides better security for the mobile device 10, it should be appreciated that the mobile device 10 may instead be configured for smart card-based access control without necessarily requiring the smart card 12 to remain in its operative position to maintain the device in an unlocked state. Alternatively, security functions such as the secure garbage collection described above, which do not render the mobile device 10 inoperable, may be executed when the smart card 12 is removed.

Figure 2:
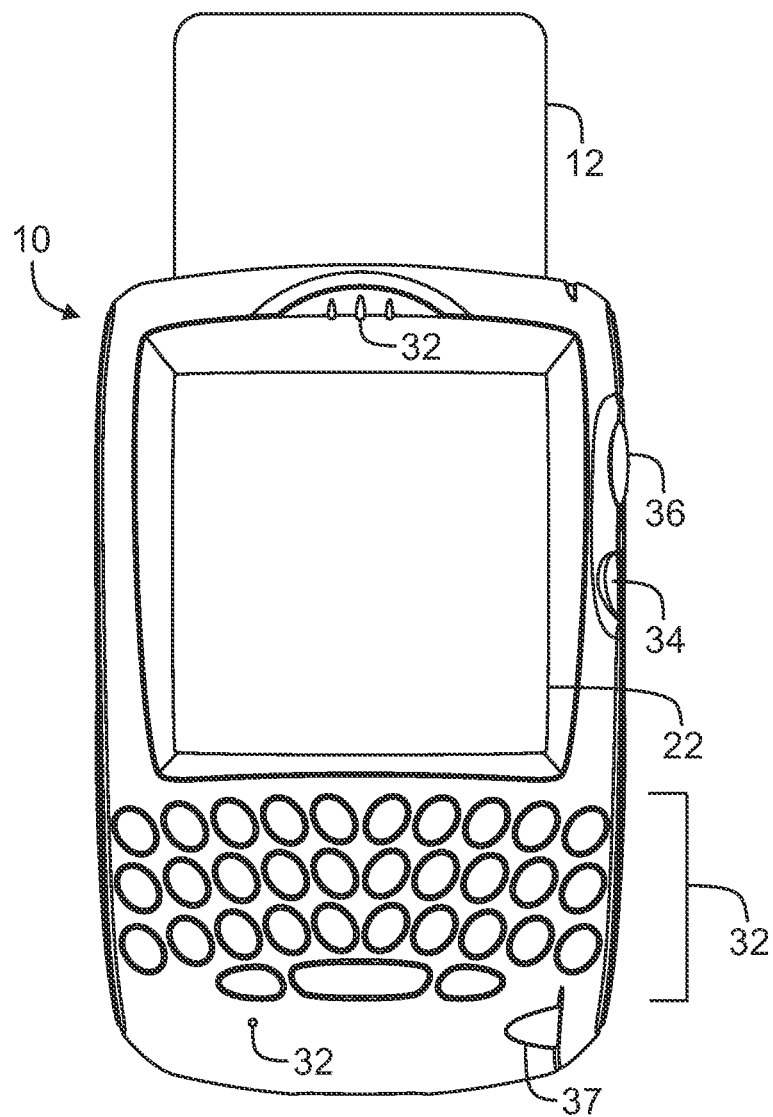
FIG. 2 is a front view of a mobile device having an integrated smart card reader.
Figure 3:
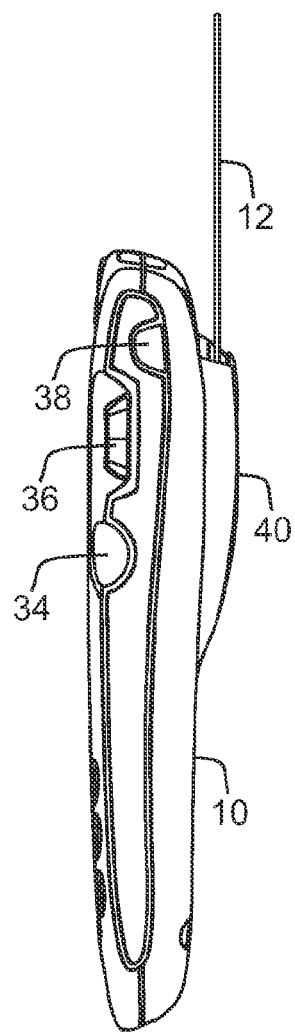
FIG. 3 is a side view of the mobile device of FIG. 2.
Figure 4:
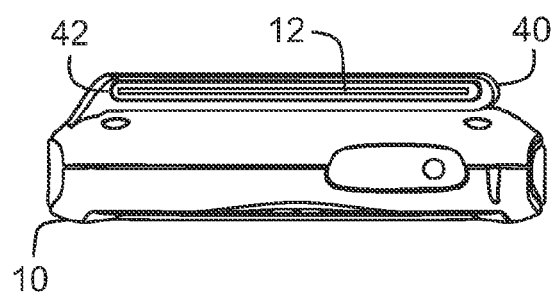
FIG. 4 is a top view of the mobile device of FIG. 2.
Figure 5:
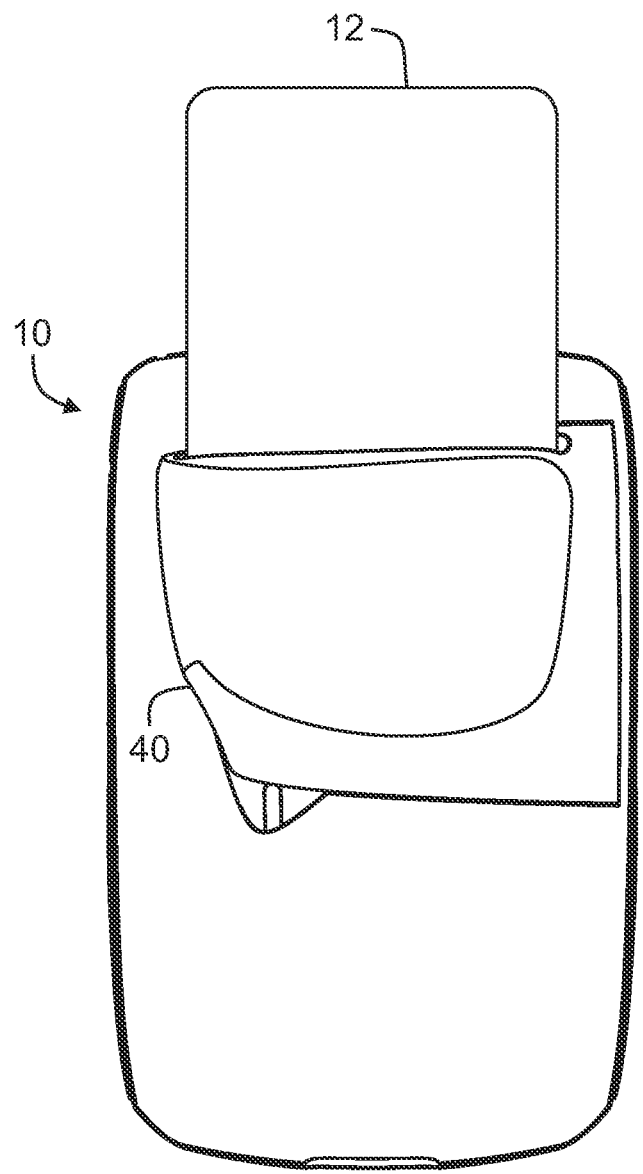
FIG. 5 is a rear view of the mobile device of FIG. 2.

In a preferred embodiment, a smart card holder or reader is integrated into the mobile device 10 to receive the smart card 12 or a portion thereof and to retain the smart card 12 in its operative position. This type of smart card reader is described below with reference to FIGS. 2-5. FIG. 2 is a front view of a mobile device having an integrated smart card reader, FIG. 3 is a side view of the mobile device of FIG. 2, FIG. 4 is a top view of the mobile device of FIG. 2, and FIG. 5 is a rear view of the mobile device of FIG. 2. Those skilled in the art will appreciate that although referred to herein primarily as a smart card reader, smart card readers typically support bi-directional information exchange, including both read and write operations, for smart cards that allow such operations.

In FIGS. 2-5, the mobile device 10 is a dual-mode wireless mobile communication device having both voice and data communication functionality. User voice input, for telephone calls or voice recording, for example, is enabled by a microphone mounted inside the mobile device 10 in the proximity of the aperture 31 in a front housing surface. Similarly, audio output is provided to a user through an internal speaker mounted proximate the aperture 33. The display 22, as described above, displays information to the user. A keyboard 32, a function key 34, a rotatable thumbwheel 36, and function keys 37 and 38 represent further examples of user input devices, shown generally at 24 in FIG. 1.

The smart card reader 40 incorporates, or is at least configured to communicate with, the interface 16 in the smart card system 14 (FIG. 1), and includes a card slot 42 for receiving the smart card 12. Components of the smart card system 14 are either implemented in the mobile device 10 or the smart card reader 14 or distributed therebetween. For example, in one embodiment, the entire smart card system 14 is implemented in the smart card reader 40, and exchanges information with the mobile device 10 through a wired or wireless communication link supported by communication ports provided in the smart card reader 40 and the mobile device 10. Alternatively, the interface 16 is integrated into the smart card reader 40 and communicates with other components of the smart card system 14 implemented in the mobile device 10 through such a communication link. As will be apparent from the foregoing description, the smart card reader 40 may also or instead incorporate an intermediate device through which the interfaces 16 and 30 are indirectly coupled. In still another embodiment, the smart card reader is a structural component that receives the smart card 12 and retains the smart card in its operative position in which the interfaces are coupled.

The card slot 42 is configured to receive at least a portion of the smart card 12. When the smart card 12 is inserted into the card slot 42 in a correct orientation typically indicated on the smart card 12 itself, its interface 30 is either directly or indirectly coupled to the interface 16. Insertion, and possibly removal, of the smart card 12 is detected by the smart card system 14 as described above.

As shown clearly in FIGS. 3-5, the smart card reader 40 is positioned at the rear of the mobile device 10. This location of the smart card reader 40 facilitates usage of the mobile device 10 when the smart card 12 is in its operative position. The display 22, the microphone at 31, the speaker at 33, and the input devices 32, 34, 36, 37, and 38 remain unobstructed by the smart card reader 40 and the smart card 12.

The smart card reader 40 is also preferably sized so as to mate with an existing mobile device housing design, thereby avoiding production of a custom housing for smart card-enabled mobile devices. Mobile device housings are then substantially the same regardless of whether a particular mobile device will be used with a smart card reader. For example, the smart card reader 40 replaces a removable battery access door at the rear of the mobile device 10.

An integrated smart card reader such as shown in FIGS. 2-5 is especially preferred when the smart card 12 must remain in its operative position to maintain the mobile device 10 in an unlocked state. The smart card reader 40 holds the smart card 12 in the operative position without interfering with the use of the mobile device 10.

Figure 6A:
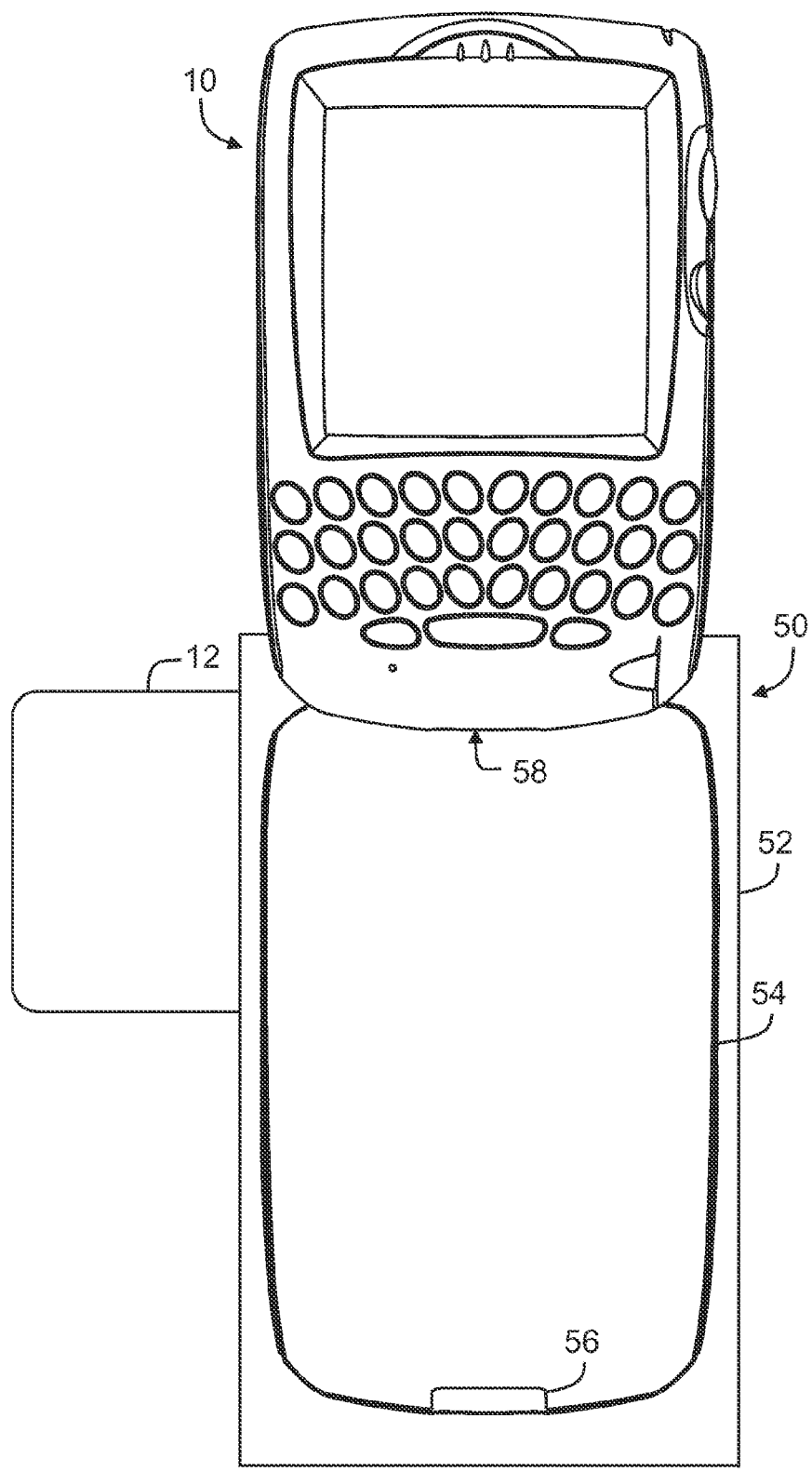
FIG. 6A is a front view of a mobile device and a separate smart card reader in conjunction with which the mobile device is configured to operate.

FIG. 6A is a front view of a mobile device and a separate smart card reader in conjunction with which the mobile device is configured to operate. In this embodiment, the smart card reader 50 is a separate component, and comprises a base 52 including a cavity 54. The cavity 54 is shaped to received the mobile device 10, and includes a communication port 56 compatible with a communication port 58 on the mobile device 10. The base 52 also includes a card slot for receiving at least a portion of the smart card 12.

Like the smart card reader 40 described above, the smart card reader 50 may incorporate any or all of the components of the smart card system 14 (FIG. 1). Alternatively, the smart card reader is primarily a structural component for holding the smart card 12 and the mobile device 10, and for indirectly coupling the interface in the smart card with the interface in the smart card system. Insertion or removal of the smart card 12 from the card slot in the smart card reader 50 is detected when the mobile device 10 is placed in or on the smart card reader 50.

The separate smart card reader 50 provides additional physical space to accommodate components associated with the smart card 12 or a smart card system, and may more easily enable backward compatibility with existing mobile devices than integrated smart card readers. A separate smart card reader such as 50 tends to be more feasible where the smart card 12 is required only to unlock the mobile device, and not to maintain the mobile device 10 in an unlocked state. In this instance, the smart card 12 is inserted into the card slot on the smart card reader 50, and the mobile device 10 is placed on the smart card reader 50 and unlocked, as described above. The unlocked mobile device can then be removed from the smart card reader 50 and used. However, a separate smart card reader that is sized and shaped to be held in a user's hands or to conform to the housing of the mobile device 10, for example, also permits use of the device while it is in or on the smart card reader.

The smart card reader 50 incorporates a smart card slot for receiving the smart card at one of its sides, whereas the communication port 56 is located toward the bottom of the reader. However, it should be appreciated that in alternate embodiments, the smart card slot is positioned at different locations on the smart card reader, including a location at which a direct coupling of the interfaces on the smart card 12 and a smart card system on the mobile device 10 is possible.

Although the smart card readers described above receive only a portion of the smart card 12, the present invention is in no way limited to a particular type of smart card reader. Depending upon available physical space, a smart card reader may be configured to receive an entire smart card to protect the smart card while in its operative position. A smart card reader need not necessarily incorporate a card slot which encloses a portion of a smart card. For example, where the reader is a structural component configured to hold the smart card in its operative position, the smart card reader could be implemented as an "open" structure, comprising one or more structural elements which engage parts, such as just the sides or the bottom, of a smart card.

In addition, particularly where the smart card 12 is not required to maintain the mobile device 10 in an unlocked state once it has been unlocked using the smart card, the smart card reader need not necessarily retain the card in its operative position. For example, the user could be prompted to hold the smart card 12 such that its interface is coupled to the mobile device smart card system interface to unlock the device. Once the mobile device is unlocked, the smart card need not be held in place.

As described above, a smart card reader either directly or indirectly couples an interface in a smart card system on a mobile device to an interface on a smart card. Standard contact or contactless smart card interfaces are preferably used for direct coupling, as well as for the smart card to smart card reader link for indirect coupling. On the smart card reader to mobile device link, different types of communication ports are feasible. The communication ports 56 and 58 may be implemented to form a wired communication link, in the case of serial ports or Universal Serial Bus (USB) ports, or a wireless communication link, where the communication ports are infrared ports such as Infrared Data Association (IrDA) ports or short-range wireless communication ports such as Bluetooth™ modules or 802.11 modules. Those skilled in the art of wireless communications will appreciate that "Bluetooth" and "802.11" refer to sets of specifications, available from the Institute of Electrical and Electronics Engineers (IEEE), relating to wireless personal area networks and wireless local area networks, respectively. Thus, references to placing a mobile device in or on a smart card reader are intended to include such operations as positioning a mobile device or part of a mobile device into or upon the reader, placing the mobile device in proximity to the reader, or arranging the mobile device and reader in another predetermined relative position to establish a wired or wireless communication link.

Figure 6B:
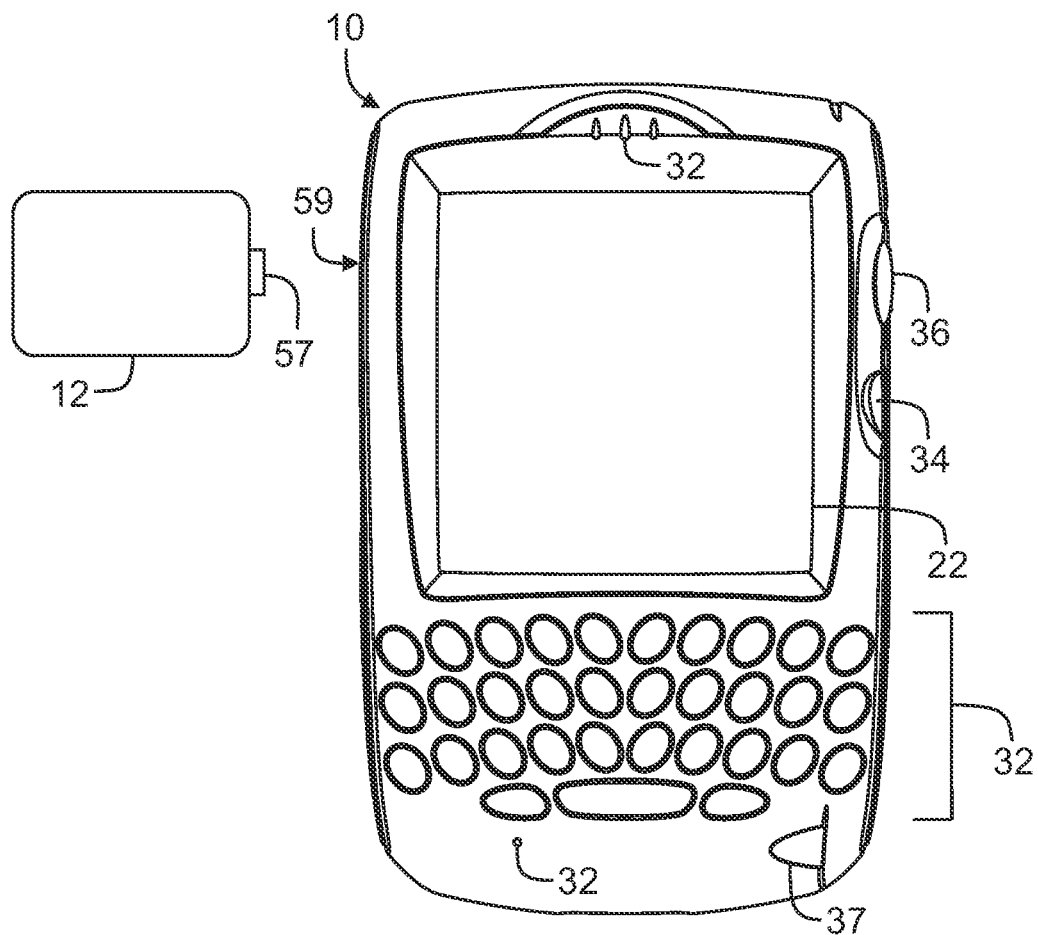
FIG. 6B is a front view of a mobile device having an alternative type of integrated smart card reader.

Another embodiment of an integrated smart card reader is shown in FIG. 6B, which is a front view of a mobile device having an alternative type of integrated smart card reader. In FIG. 6B, the smart card 12 incorporates a communication port 57 configured to establish a communication link with the mobile device 10 through a compatible communication port 59. Such a system as shown in FIG. 6B is contemplated, for example, for "token" types of smart cards. Token-type smart cards generally have a different form factor than conventional smart cards such as those that conform to the International Organization for Standardization (ISO) standard 7816. In one possible implementation, a token-type smart card and an electronic device configured to support such a smart card incorporate USB ports.

Other embodiments of both integrated and separate smart card readers will be apparent to those skilled in the art, and as such, are considered to be within the scope of the present invention, which is not limited to or dependent upon any particular type of smart card reader.

Figure 7:
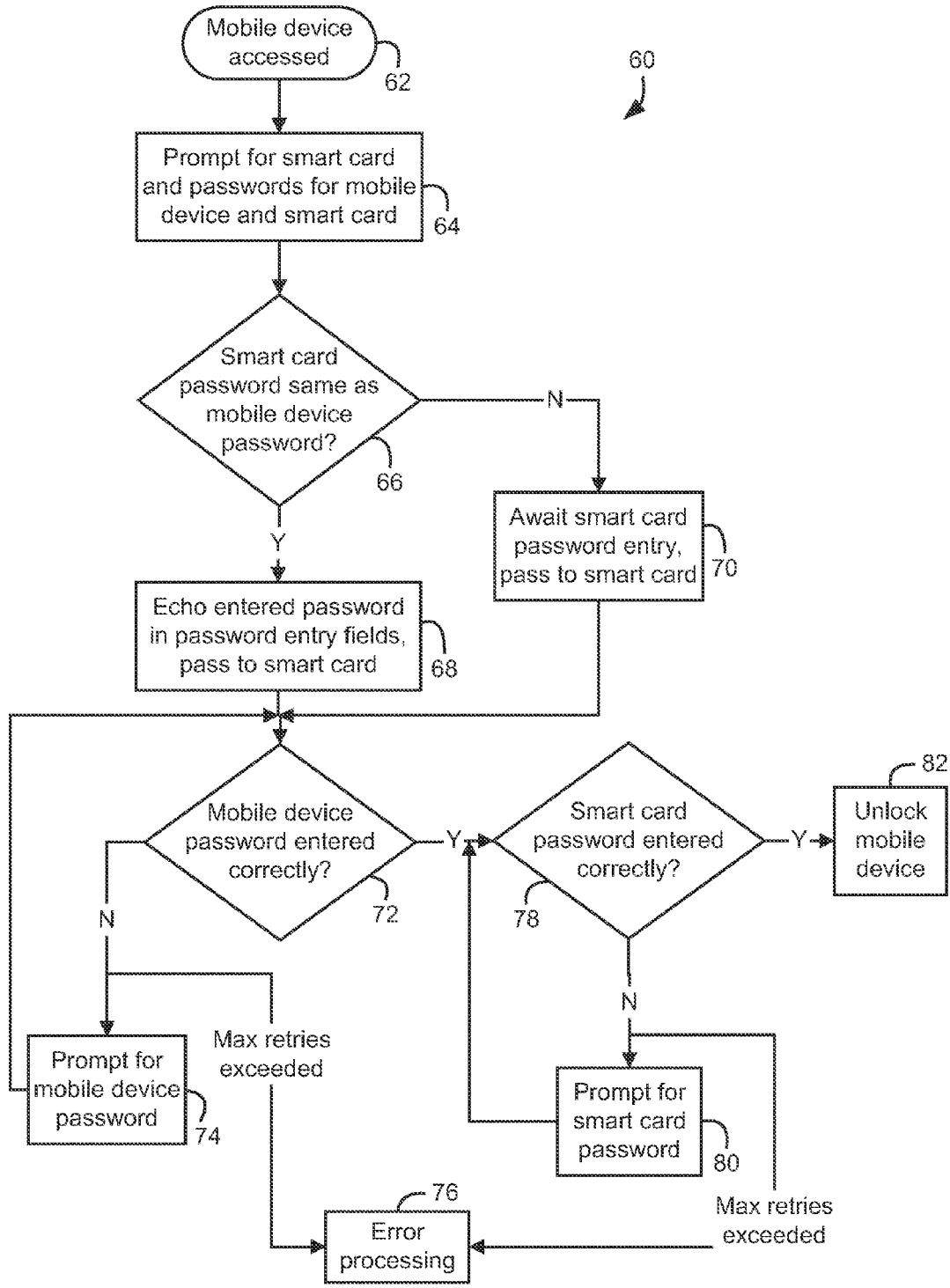
FIG. 7 is a flow diagram illustrating a method of unlocking a mobile device.

FIG. 7 is a flow diagram illustrating a method of unlocking a mobile device. In the method 60, an attempt to access a mobile device, such as a key press or operation of some other input device, is detected at step 62. At step 64, a user is prompted for a smart card, if it is not already in its operative position, a password for the mobile device, and a password for the smart card. Those skilled in the art will appreciate that both a smart card and a mobile device may have an associated password. Password prompting is typically accomplished by displaying a data entry screen including one or more data entry fields. At step 64, the user is preferably prompted for the passwords by displaying a password entry screen including an electronic device password entry field and a smart card password entry field, although the user could instead be prompted for each password separately.

In order to reduce the number of passwords used, many users set the same password for different devices or services. Step 66, in which it is determined whether the smart card password and the mobile device password are the same, simplifies password entry for the user where the passwords are the same. The operation at step 66 is enabled, for example, by storing password information for both the mobile device and the smart card in the memory 20 (FIG. 1). The stored password information may be the actual respective passwords, but is preferably non-reversibly transformed versions of the passwords, such as hashes of the passwords. Transformed versions of the passwords are preferred to prevent recovery of the passwords from the memory 20. Stored password information is compared to determine whether the passwords are the same.

Where the passwords are the same, the entered password, or preferably a masked or obscured version thereof, is echoed in both password entry fields at step 68, whether those fields are presented to the user on the same screen or different screens, and the entered password is passed to the smart card. This echoing provides the user with an indication that the password need not be entered twice. If the passwords are not the same, then user entry of the smart card password is awaited at step 70, and the smart card password is passed to the smart card.

At step 72, it is then determined whether the mobile device password has been entered correctly. Referring back to FIG. 1, the processor 18 preferably checks the entered password against a mobile device password stored in the memory 20. Where the entered password matches the mobile device password, the method proceeds at step 78. In the event of that the password is not entered correctly, the user is prompted to re-enter the mobile device password at step 74. After a pre-configured maximum number of retries, processing reverts to step 76. Error processing at step 76 may include such operations as displaying an error message to the user or erasing all data stored in the memory mobile device 20, the smart card memory 26, or both, for example.

The password entered at step 66 or 70 is passed to the smart card system 14 by the processor 18 for transfer to the smart card 12. The smart card processor 28 then checks the entered password against a smart card password stored in the memory 26, at step 78, and returns a result to the mobile device 10. As described above, storing transformed versions the passwords instead of the actual passwords prevents recovery of the passwords by reading stored data from memory. In this case, the entered password is transformed by each of the processors 18 and 30 and compared to the stored transformed versions.

Although a transformed version of the smart card password may be stored in the memory 20, checking of the smart card password by the smart card processor 28 is generally preferred. Where the smart card password is used in conjunction with more than one device or system, it is possible that the smart card password has been changed since the transformed version of a previous password was stored in the memory 20. Separate password checks, even when the mobile device password and the smart card password are the same, also supports different password checking algorithms and policies for the mobile device and the smart card.

The mobile device is unlocked at step 82 when the smart card password has been entered correctly. A predetermined number of smart card password retries, which may or may not be the same as the maximum number of device password retries, is allowed at step 80 before the method proceeds to step 76, as described above.

The method 60 represents one possible implementation of smart card-based mobile device security. Several possible variations of the method 60 are described in further detail below.

In the method 60, it is assumed that the user enters the mobile device password, as will be apparent from step 70. However, the user could instead first be prompted for the smart card password, in which case the mobile device password is entered at step 70 and passed to the mobile device processor. If the user is prompted for both passwords at the same time, then either password could be entered first, and the other entered at step 70 and passed to the appropriate processor where the passwords are not the same. Similarly, the order of the checks at steps 72 and 78 may be reversed, or performed substantially simultaneously.

Echoing of an entered password in multiple password entry fields, as shown at step 68 and described above, is one, but by no means the only, possible way to indicate a correspondence between a mobile device password and a smart card password. For example, the steps 64 and 66 could be performed in reverse order. A password prompt screen could then be modified to display only one of two password entry fields, to remove one of two displayed password entry fields, or to display a password correspondence indicator, in response to a positive determination at 66.

In another alternative embodiment, a user is prompted for both passwords when either of them has not been entered correctly, as determined at step 72 or step 78. In this case, reverting to a separate password prompt after some predetermined number of incorrect entries may be desirable to avoid a situation in which smart card password information stored on an electronic device is out of date, and the determination at step 66 is incorrect.

FIG. 7 also indicates that error processing is executed at step 76 after the maximum number of retries. Alternatively, default processing may include unlocking the mobile device or certain features or function thereof provided at least the mobile device password has been entered correctly. This type of access control enables different levels of security for different device functions. Low-security functions, such as a calculator, for example, could be unlocked without a smart card, whereas other functions require a smart card and a correctly entered smart card password.

As described above, step 66 simplifies password entry when a mobile device password and a smart card password are the same. A user may therefore wish to ensure that any password change on the smart card is also made at the mobile device. To this end, a correctly entered smart card password is preferably also set as the mobile device password responsive to a positive determination at step 78. Normally, a user must reset a current mobile device password by entering both the current password and a new password. However, both the current mobile device password and the desired new password (i.e., the smart card password) have been correctly entered, as determined at steps 72 and 78, such that automatic mobile device password reset is no less secure than conventional password reset. This feature is preferably user- or owner-configurable or dependent upon a confirmation that a current password should be reset, as some users might prefer to maintain different passwords for the smart card and the mobile device. It should be apparent that mobile device password changes could also or instead be automatically reflected on the smart card.

In order to maintain current smart card password information on a mobile device to thereby ensure an accurate determination at step 66, a transformed version of the smart card password, or other smart card password information, is preferably passed to the mobile device responsive to a positive determination at step 78, when the smart card was entered correctly but separately from the mobile device password at step 64, step 70, or step 80, or when such an operation is invoked by a user, for example. The new smart card password information is then stored in the mobile device memory. A further extension of this operation involves a determination by the mobile device processor as to whether the smart card password information stored at the mobile device matches the new smart card password information received from the smart card. The stored smart card password information is then replaced with the new smart card password information if the stored smart card password information does not match the new smart card password information.

In a corporate office, access to network-connected computer systems is often associated with user accounts instead of particular computer systems. Mobile devices, on the other hand, are typically associated with a particular user. According to a further aspect of the invention, a smart card is associated with a particular mobile device.

Figure 8:
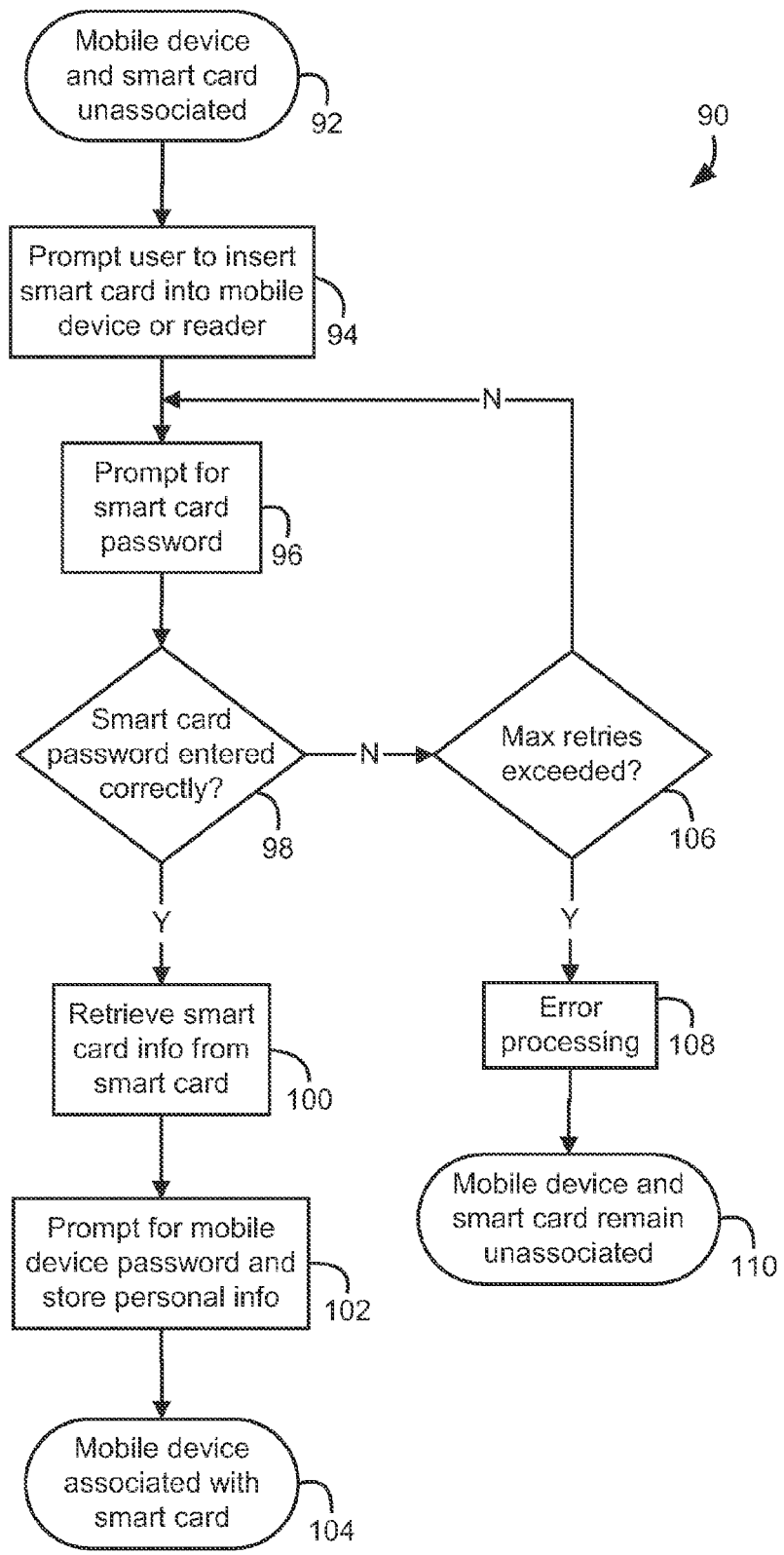
FIG. 8 is a flow diagram illustrating a method of associating a smart card with a mobile device.

FIG. 8 is a flow diagram illustrating a method of associating a smart card with a mobile device. At 92, a mobile device and smart card are unassociated. Although the smart card might be enabled for other functions, such as corporate premises or computer system access, it has not yet been configured for operation with the mobile device.

At step 94 in the method 90, the user is prompted to place the smart card in its operative position, by inserting the smart card into the mobile device or a card reader, for example. The user is then prompted for the smart card password. The entered password is transferred to the smart card and checked at step 98. If the smart card password has been entered correctly, then information stored on the smart card, such as a user name or identifier, a smart card serial number, or the like, is retrieved from the smart card memory 26 (FIG. 1) at step 100. At step 102, the user is prompted for a mobile device password, which may or may not be the same as the smart card password, and the smart card information retrieved from the smart card is stored in the mobile device memory 20 where the mobile device password is entered correctly. Although mobile device password checking is not explicitly shown in FIG. 8 to avoid congestion in the drawing, it will be apparent to those skilled in the art that such a password check is implicit in step 102 and generally preferred to avoid association of one user's smart card with another user's mobile device. Storage of smart card information on the mobile device at step 102 creates an association between the mobile device and the smart card, as indicated at 104.

Referring back to step 98, the method proceeds to step 106 when the smart card password has not been entered correctly. If the maximum number of password retries has not been exceeded, as determined at step 106, then the user is again prompted for the smart card password at step 96. Otherwise, error processing operations, such as displaying an error message to the user, are performed at step 108, and the mobile device and smart card remain unassociated, as indicated at 110.

In FIG. 8, it is assumed that the mobile device has not been associated with the smart card. In alternative implementations, a mobile device supports an association with only a single smart card or a number of different smart cards, as specified in configuration settings or a usage control policy file on the mobile device, for example. For such devices, the method of FIG. 8 is preferably modified to include the steps of determining whether the mobile device is already associated with a smart card, determining whether the mobile device supports more than one association where the mobile device is already associated with a smart card, and proceeding to create an association where the mobile device either is not already associated with a smart card or supports more than one association.

An association between a mobile device and a smart card is thereby created, providing further enhanced security in that only a particular smart card, or possibly a limited number of smart cards that have been associated with the device substantially as described above, can be used with the mobile device. Where a smart card is used to unlock a mobile device, then a method such as shown in FIG. 7 includes steps to retrieve smart card information from the smart card memory, to compare the retrieved information with the smart card information stored on the mobile device, and to revert to error processing operations if the retrieved and stored smart card information do not match.

Associating particular smart cards with mobile devices also enables another default processing scheme in response to a failure of the mobile device password check at step 72 (FIG. 7). In the method 60, the mobile device password, the smart card, and the smart card password must be provided in order to unlock the mobile device. However, where the mobile device is associated with a particular smart card, smart card-based mobile device access control could be an alternative to a mobile device password. According to another aspect of the invention, if the mobile device password check fails, but the smart card password has been entered correctly, then smart card information is retrieved from the smart card and compared to the smart card information stored on the mobile device. The mobile device is then unlocked where the retrieved smart card information matches the stored smart card information. If the retrieved information does not match the stored information, then an error message indicating that the smart card cannot be used with the mobile device is preferably output to a user, and further error processing operations may also be performed.

In accordance with a further aspect of the invention, the information retrieved from a smart card and loaded onto a mobile device when the device and smart card association is created includes common smart card information that is stored on a plurality of smart cards. In the case of a company, for example, every corporate smart card might store a company name. Storing the company name on each device that is associated with a corporate smart card provides for such a feature as allowing access to a limited set of mobile device resources or functions whenever a corporate smart card storing the same company name is inserted into a mobile device or a corresponding smart card reader, and the password for that smart card is correctly entered by a user. Thus, a subset of mobile device resources or functions are accessible when a portion of smart card information retrieved from a smart card matches a portion of smart card information stored on the mobile device.

Figure 9:
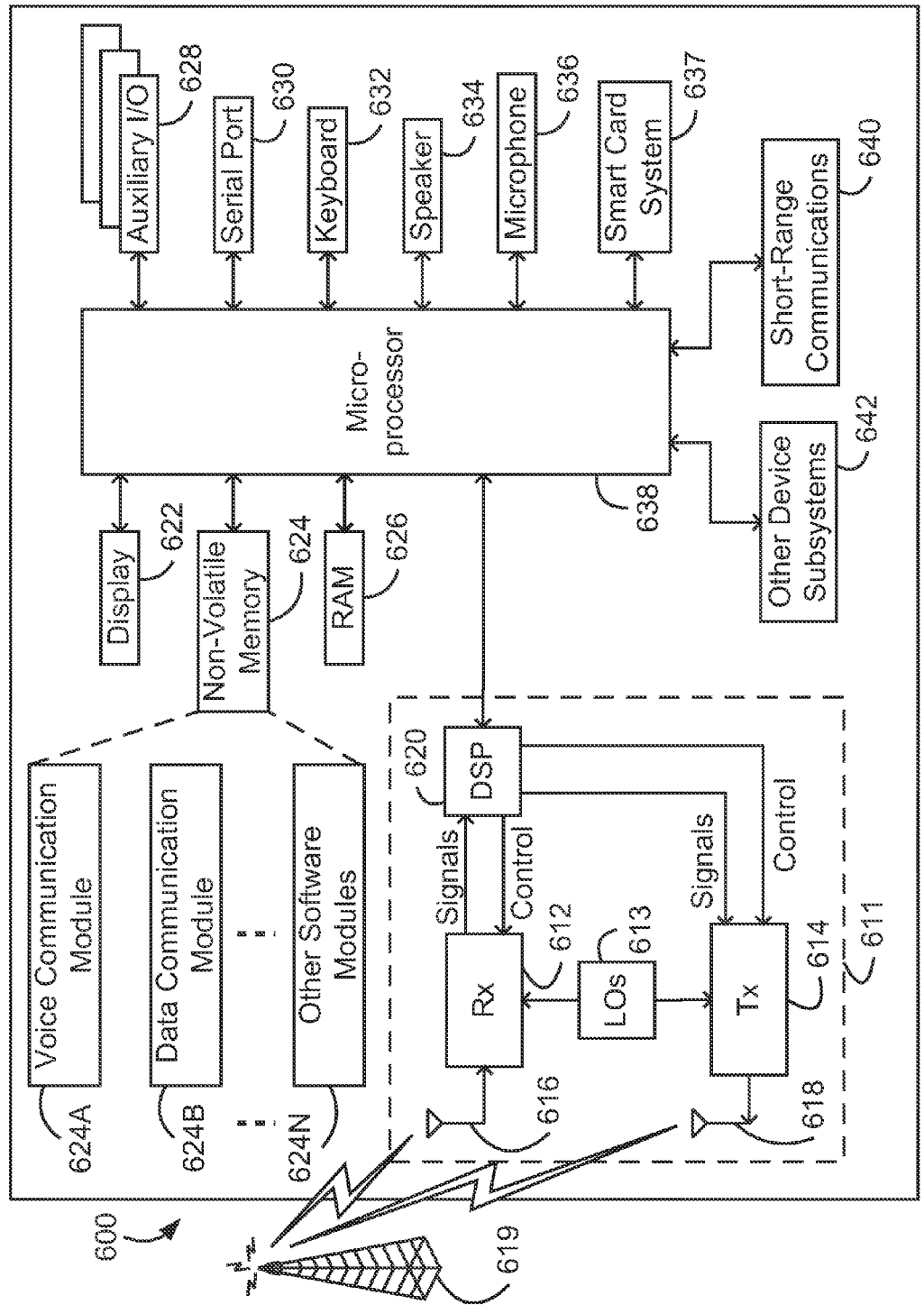
FIG. 9 is a block diagram of a mobile device implementing a system and method of supporting smart cards.

Having described smart card support in accordance with various aspects of the invention, an embodiment of a mobile device will now be described. FIG. 9 is a block diagram of a mobile electronic device implementing a system and method of supporting smart cards.

The mobile device 600 is preferably a two-way communication device having at least voice and data communication capabilities. The mobile device 600 preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

The mobile device 600 includes a transceiver 611, a microprocessor 638, a display 622, a non-volatile memory 624, a RAM 626, auxiliary input/output (I/O) devices 628, a serial port 630, a keyboard 632, a speaker 634, a microphone 636, a smart card system 637, a short-range wireless communications sub-system 640, and other device sub-systems 642. The transceiver 611 includes transmit and receive antennas 616 and 618, a receiver (Rx) 612, a transmitter (Tx) 614, one or more local oscillators (LOs) 613, and a digital signal processor (DSP) 620. Within the non-volatile memory 624, the mobile device 600 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions. The smart card system 637, or at least smart card-related functions, may also be implemented as software applications or utilities in the non-volatile memory 624.

As described above, the mobile device 600 is preferably a two-way communication device having voice and data communication capabilities. Thus, for example, the mobile device 600 may communicate over a voice network, such as any of the analog or digital cellular networks, and may also communicate over a data network. The voice and data networks are depicted in FIG. 9 by the communication tower 619. These voice and data networks may be separate communication networks using separate infrastructure, such as base stations, network controllers, etc., or they may be integrated into a single wireless network.

The communication subsystem 611 is used to communicate with the network 619. The DSP 620 is used to send and receive communication signals to and from the transmitter 614 and receiver 612, and also exchanges control information with the transmitter 614 and receiver 612. If the voice and data communications occur at a single frequency, or closely-spaced set of frequencies, then a single LO 613 may be used in conjunction with the transmitter 614 and receiver 612. Alternatively, if different frequencies are utilized for voice communications versus data communications, then a plurality of LOs 613 are typically used to generate a plurality of frequencies corresponding to the network 619. Although two antennas 616, 618 are depicted in FIG. 9, the mobile device 600 could be used with a single antenna structure. Information, which includes both voice and data information, is communicated to and from the communication module 611 via a link between the DSP 620 and the microprocessor 638.

The detailed design of the communication subsystem 611, such as frequency band, component selection, power level, etc., is dependent upon the communication network 619 in which the mobile device 600 is intended to operate. For example, a mobile device intended to operate in a North American market may include a communication subsystem 611 designed to operate with the Mobitex™ or DataTAC™ mobile data communication networks and also designed to operated with any of a variety of voice communication networks, such as AMPS, TDMA, CDMA, PCS, etc., whereas a mobile device 600 intended for use in Europe may be configured to operate with the GPRS data communication network and the GSM voice communication network. Other types of data and voice networks, both separate and integrated, may also be utilized with the mobile device 600.

Depending upon the type of network 619, the access requirements for the dual-mode mobile device 600 may also vary. For example, in the Mobitex and DataTAC data networks, mobile devices are registered on the network using a unique identification number associated with each device. In GPRS data networks, however, network access is associated with a subscriber or user of a mobile device 600. A GPRS device typically requires a subscriber identity module ("SIM"), which is required in order to operate the mobile device 600 on a GPRS network. Local or non-network communication functions (if any) may be operable, without the SIM, but the mobile device 600 will be unable to carry out any functions involving communications over the network 619, other than any legally required operations, such as '911' emergency calling.

After any required network registration or activation procedures have been completed, the mobile device 600 may send and receive communication signals, preferably including both voice and data signals, over the network 619. Signals received by the antenna 616 from the communication network 619 are routed to the receiver 612, which provides for such common receiver functions as signal amplification, frequency down conversion, filtering, channel selection, and analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618. Although a single transceiver 611 is shown in FIG. 9 for both voice and data communications, alternative mobile devices may include distinct transceivers, a first transceiver for voice signals, and a second transceiver for data signals.

In addition to processing the communication signals, the DSP 620 also provides for receiver and transmitter control. For example, the gain levels applied to communication signals in the receiver 612 and transmitter 614 may be adaptively controlled through automatic gain control algorithms implemented in the DSP 620. Other transceiver control algorithms, when implemented in the DSP 620, provide more sophisticated control of the transceiver 611.

The microprocessor 638 preferably manages and controls the overall operation of the mobile device 600. Many types of microprocessors or microcontrollers could be used for this part, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the non-volatile memory 624 for execution by the microprocessor 638. For example, the voice communication module 624A provides a high-level user interface operable to transmit and receive voice calls between the mobile device 600 and a plurality of other voice devices via the network 619. Similarly, the data communication module 624B provides a high-level user interface operable for sending and receiving data, such as e-mail messages, files, organizer information, short text messages, etc., between the mobile device 600 and a plurality of other data devices via the network 619.

The microprocessor 638 also interacts with other device subsystems, such as the display 622, the non-volatile memory 624, the random access memory (RAM) 626, the auxiliary input/output (I/O) subsystems 628, the serial port 630, the keyboard 632, the speaker 634, the microphone 636, the smart card system 637, the short-range communications subsystem 640, and any other device subsystems generally designated as 642.

Smart card support as described herein is enabled by the smart card system 637. An interface to a smart card is provided by an interface in the smart card system 637 or possibly an auxiliary I/O device 628, the serial port 630, the short-range communications subsystem 640, or another suitable device subsystem 642.

Some of the subsystems shown in FIG. 9 perform communication-related functions, whereas other subsystems may provide "resident" or on-device functions. Notably, some subsystems, such as the keyboard 632 and the display 622 are used for both communication-related functions, such as entering a text message for transmission over a data communication network, and device-resident functions such as a calculator or task list or other PDA-type functions.

Operating system software used by the microprocessor 638 is preferably stored in a persistent store such as the non-volatile memory 624. In addition to the operating system and communication modules 624A-N, the non-volatile memory 624 may also include a file system for storing data. A storage area is also preferably provided in the non-volatile memory 624 to store public keys, a private key, and other information required for secure messaging. The operating system, specific device applications or modules, or parts thereof, may be temporarily loaded into a volatile store, such as the RAM 626, for faster operation. Moreover, received communication signals may also be temporarily stored to RAM 626 before permanently writing them to a file system located in the non-volatile store 624. As those skilled in the art will appreciate, the non-volatile store 624 may be implemented as a Flash memory component or a battery backed-up RAM, for example.

An exemplary application module 624N that may be loaded onto the mobile device 600 is a PIM application providing PDA functionality, such as calendar events, appointments, and task items. This module 624N may also interact with the voice communication module 624A for managing phone calls, voice mails, etc., and may also interact with the data communication module 624B for managing e-mail communications and other data transmissions. Alternatively, all of the functionality of the voice communication module 624A and the data communication module 624B may be integrated into the PIM module.

The non-volatile memory 624 preferably provides a file system to facilitate storage of PIM data items on the mobile device 600. The PIM application preferably includes the ability to send and receive data items, either by itself, or in conjunction with the voice and data communication modules 624A and 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user.

The mobile device 600 may also be manually synchronized with a host system by placing the mobile device 600 in an interface cradle, which couples the serial port 630 of the mobile device 600 to the serial port of the host system. The serial port 630 may also be used to enable a user to establish messaging settings through an external device or software application, to download other application modules 624N for installation, to interface with a smart card reader, and to load information onto a device. This wired download path provides a more physically secure communication link for information exchange than the wireless network 619.

Additional application modules 624N may be loaded onto the mobile device 600 through the network 619, through an auxiliary I/O subsystem 628, through the serial port 630, through the short-range communications subsystem 640, or through any other suitable subsystem 642, and installed by a user in the non-volatile memory 624 or RAM 626. Such flexibility in application installation increases the functionality of the mobile device 600 and may provide enhanced on-device functions, communication-related functions, or both. For example, secure communication applications may enable electronic commerce functions and other such financial transactions to be performed using the mobile device 600.

When the mobile device 600 is operating in a data communication mode, a received signal, such as a text message or a web page download, is processed by the transceiver 611 and provided to the microprocessor 638, which preferably further processes the received signal for output to the display 622, or, alternatively, to an auxiliary I/O device 628. A user of mobile device 600 may also compose data items, such as email messages, using the keyboard 632, which is preferably a complete alphanumeric keyboard laid out in the QWERTY style, although other styles of complete alphanumeric keyboards such as the known DVORAK style may also be used. User input to the mobile device 600 is further enhanced with a plurality of auxiliary I/O devices 628, which may include a thumbwheel input device, a touchpad, a variety of switches, a rocker input switch, etc. The composed data items input by the user may then be transmitted over the communication network 619 via the transceiver 611.

When the mobile device 600 is operating in a voice communication mode, the overall operation of the mobile device 600 is substantially similar to the data mode, except that received signals are preferably output to the speaker 634 and voice signals for transmission are generated by a microphone 636. Alternative voice or audio I/O subsystems, such as a voice message recording subsystem, may also be implemented on the mobile device 600. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module 624A and the operating system software, detects the caller identification information of an incoming voice call and displays it on the display 622.

The short-range communications subsystem 640 may include an infrared device and associated circuits and components, or a short-range wireless communication module such as a Bluetooth communication module or an 802.11 module to provide for communication with similarly-enabled systems and devices.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, although described above primarily in the context of smart cards, the present invention is applicable for supporting other types of portable authenticators as well, including electronic tokens.

In addition, the aspects of the present invention described herein are not predicated on any particular features of an electronic device. Some challenges associated with supporting portable authenticators on mobile electronic devices are addressed by the present invention, but the invention is in no way limited to mobile devices. The principles described herein are relevant to electronic devices in general, not only to mobile devices, communication devices, or any other type of electronic device.

Those skilled in the art will appreciate that access control is but one function of smart cards. For example, smart cards provide a secure means for providing confidential information such as a private cryptographic key to a user while avoiding direct retrieval of such information, as described briefly above. A smart card in its operative position then provides access to cryptographic keys to be used for such functions as encryption and decryption of information, digitally signing information, and checking digital signatures on information. Public keys, digital certificates, and other non-confidential cryptographic information keys that are not secret may also be loaded onto an electronic device from the smart card so that some of these operations can be performed without the smart card in its operative position. When an encrypted and then digitally signed message is received by a mobile device, for example, a digital signature can be checked using a public key in a digital certificate that was transferred from the smart card to the mobile device. Then, when a user wishes to access the content of the message, the smart card is placed in its operative position, the device and smart card passwords are entered and checked if applicable, and a private cryptographic key stored on the smart card is used by the mobile device to decrypt the message. Alternatively, such encrypted content is transferred to the smart card for decryption, so that a decryption function is available to the mobile device but private cryptographic keys themselves are not. Other operations using information stored on a smart card can be handled in a similar manner.

What is claimed is:

1. A method in an electronic device of facilitating access to the electronic device, the method comprising:
   detecting at the electronic device an attempt to access the electronic device;
   in response to detecting the attempt, prompting for password entry at the electronic device;
   receiving an entered password at the electronic device;
   performing at the electronic device a first determination whether the entered password corresponds to a stored electronic device password;
   transmitting the entered password to a portable authenticator that is communicably coupled to the electronic device, in order for the portable authenticator to perform a second determination whether the entered password corresponds to a stored portable authenticator password;

receiving the second determination from the portable authenticator; and controlling access to the electronic device in accordance with the first determination and the second determination.

2. The method as claimed in claim 1, wherein the first determination is that the entered password corresponds to the stored electronic device password and the second determination is that the entered password corresponds to the stored portable authenticator password, the method further comprising:

providing access to the electronic device.

3. The method as claimed in claim 2, further comprising: maintaining access to the electronic device after detecting decoupling of the portable authenticator from the electronic device.

4. The method as claimed in claim 2, further comprising: terminating access to the electronic device after detecting decoupling of the portable authenticator from the electronic device.

5. The method as claimed in claim 2, further comprising: activating one or more security functions after detecting decoupling of the portable authenticator from the electronic device.

6. The method as claimed in claim 5, wherein the one or more security functions comprise clearing information from a display of the electronic device.

7. The method as claimed in claim 5, wherein the one or more security functions comprise erasing previously encrypted information that was decrypted and stored at the electronic device after providing access to the electronic device.

8. The method as claimed in claim 1, wherein the second determination is that the entered password does not correspond to the stored portable authenticator password, the method further comprising:

denying unrestricted access to the electronic device.

9. The method as claimed in claim 8, the method further comprising:

performing one or more error processing operations.

10. The method as claimed in claim 9, wherein the one or more error processing operations comprise erasing one or more data items stored at the electronic device or erasing one or more data items stored at the portable authenticator or both.

11. The method as claimed in claim 9, wherein the first determination is that the entered password corresponds to the stored electronic device password and wherein the error processing operations comprise providing access only to one or more low-security functions of the electronic device.

12. A method in an electronic device of facilitating access to the electronic device, the method comprising:

detecting an attempt to access the electronic device;

in response to detecting the attempt, prompting for entry of a first password and a second password at the electronic device;

receiving a first entered password and a second entered password at the electronic device;

performing at the electronic device a first determination whether the first entered password corresponds to a stored electronic device password;

transmitting the second entered password to a portable authenticator that is communicably coupled to the electronic device, in order for the portable authenticator to perform a second determination whether the second entered password corresponds to a first stored portable authenticator password;

receiving the second determination from the portable authenticator; and controlling access to the electronic device in accordance with the first determination and the second determination.

13. The method as claimed in claim 12, wherein the first determination is that the first entered password corresponds to the stored electronic device password and the second determination is that the second entered password corresponds to the first stored portable authenticator password, the method further comprising:

providing access to the electronic device.

14. The method as claimed in claim 13, further comprising: replacing the electronic device password with the second entered password.

15. The method as claimed in claim 13, wherein the electronic device stores a second stored portable authenticator password, the method further comprising:

receiving the first stored portable authenticator password from the portable authenticator; and wherein the first stored portable authenticator password does not correspond to the second stored portable authenticator password, replacing the second stored portable authenticator password stored at the electronic device with the first stored portable authenticator password received from the portable authenticator.

16. An electronic device comprising:

a portable authenticator interface through which the electronic device is configured to be communicably coupled to a portable authenticator;

an input device through which the electronic device is configured to receive an entered password;

a processor communicably coupled to the portable authenticator interface and to the input device; and a memory communicably coupled to the processor, the memory to store software arranged:

to prompt for password entry at the electronic device in response to detecting at the electronic device an attempt to access the electronic device;

to receive the entered password via the input device;

to perform at the electronic device a first determination whether the entered password corresponds to a stored electronic device password;

to transmit the entered password to the portable authenticator via the portable authenticator interface, in order for the portable authenticator to perform a second determination whether the entered password corresponds to a stored portable authenticator password;

to receive the second determination from the portable authenticator via the portable authenticator interface; and to control access to the electronic device in accordance with the first determination and the second determination.

17. The electronic device as claimed in claim 16, wherein the first determination is that the entered password does not correspond to the stored electronic device password and the second determination is that the entered password corresponds to the stored portable authenticator password, the software further arranged:

to receive portable authenticator information from the portable authenticator via the portable authenticator interface; and where a portion of the portable authenticator information matches a corresponding portion of portable authenticator information stored in the memory of the electronic device, to provide access to a subset of functions of the electronic device and to deny unrestricted access to the electronic device.

18. The electronic device as claimed in claim 16, wherein the first determination is that the entered password does not correspond to the stored electronic device password and the second determination is that the entered password corresponds to the stored portable authenticator password, the software further arranged:
    to receive portable authenticator information from the portable authenticator via the portable authenticator interface; and
    where the portable authenticator information matches portable authenticator information stored in the memory of the electronic device, to provide access to the electronic device.

19. An electronic device comprising:
    a portable authenticator interface through which the electronic device is configured to be communicably coupled to a portable authenticator;
    an input device through which the electronic device is configured to receive a first entered password and a second entered password;
    a processor communicably coupled to the portable authenticator interface and to the input device; and
    a memory communicably coupled to the processor, the memory to store software arranged:
        to prompt for entry of a first password and a second password at the electronic device in response to detecting an attempt to access the electronic device;
        to receive the first entered password and the second entered password via the input device;
        to perform at the electronic device a first determination whether the first entered password corresponds to a stored electronic device password;
        to transmit the second entered password to a portable authenticator via the portable authenticator interface, in order for the portable authenticator to perform a second determination whether the second entered password corresponds to a stored portable authenticator password;
        to receive the second determination from the portable authenticator via the portable authenticator interface; and
        to control access to the electronic device in accordance with the first determination and the second determination.

20. The electronic device as claimed in claim 19, wherein the first determination is that the first entered password corresponds to the stored electronic device password and the second determination is that the second entered password corresponds to the stored portable authenticator password, the software further arranged:
    to provide access to the electronic device.

21. The electronic device as claimed in claim 19, wherein the second determination is that the second entered password does not correspond to the stored portable authenticator password, the software further arranged:
    to deny unrestricted access to the electronic device.

22. The electronic device as claimed in claim 21, wherein the first determination is that the first entered password corresponds to the stored electronic device password, the software further arranged:
    to provide access only to one or more low-security functions of the electronic device.

23. A non-transitory computer readable medium able to be communicably coupled to a processor of an electronic device, the computer readable medium storing software arranged:
    to prompt for password entry at the electronic device in response to detecting at the electronic device an attempt to access the electronic device;
    to receive an entered password via an input device of the electronic device;
    to perform at the electronic device a first determination whether the entered password corresponds to a stored electronic device password;
    to transmit the entered password from the electronic device to a portable authenticator via a portable authenticator interface of the electronic device, in order for the portable authenticator to perform a second determination whether the entered password corresponds to a stored portable authenticator password;
    to receive the second determination from the portable authenticator via the portable authenticator interface; and
    to control access to the electronic device in accordance with the first determination and the second determination.

24. The non-transitory computer readable medium as claimed in claim 23, wherein the first determination is that the entered password does not correspond to the stored electronic device password and the second determination is that the entered password corresponds to the stored portable authenticator password, the software further arranged:
    to receive portable authenticator information from the portable authenticator via the portable authenticator interface; and
    a portion of the portable authenticator information matches a corresponding portion of portable authenticator information stored in the memory of the electronic device, to provide access to a subset of functions of the electronic device and to deny unrestricted access to the electronic device.

25. The non-transitory computer readable medium as claimed in claim 23, wherein the first determination is that the entered password does not correspond to the stored electronic device password and the second determination is that the entered password corresponds to the stored portable authenticator password, the software further arranged:
    to receive portable authenticator information from the portable authenticator via the portable authenticator interface; and
    where the portable authenticator information matches portable authenticator information stored in the memory of the electronic device, to provide access to the electronic device.

26. A non-transitory computer readable medium able to be communicably coupled to a processor of an electronic device, the computer readable medium storing software arranged:
    to prompt for entry of a first password and a second password at the electronic device in response to detecting an attempt to access the electronic device;
    to receive a first entered password and a second entered password via an input device of the electronic device;
    to perform at the electronic device a first determination whether the first entered password corresponds to a stored electronic device password;
    to transmit the second entered password from the electronic device to a portable authenticator via a portable authenticator interface of the electronic device, in order for the portable authenticator to perform a second determination whether the second entered password corresponds to a stored portable authenticator password;

to receive the second determination from the portable authenticator via the portable authenticator interface; and to control access to the electronic device in accordance with the first determination and the second determination.

27. The non-transitory computer readable medium as claimed in claim 26, wherein the first determination is that the first entered password corresponds to the stored electronic device password and the second determination is that the second entered password corresponds to the stored portable authenticator password, the software further arranged:

to provide access to the electronic device.

28. The non-transitory computer readable medium as claimed in claim 26, wherein the second determination is that the second entered password does not correspond to the stored portable authenticator password, the software further arranged:

to deny unrestricted access to the electronic device.

29. The non-transitory computer readable medium as claimed in claim 28, wherein the first determination is that the first entered password corresponds to the stored electronic device password, the software further arranged:

provide access only to one or more low-security functions of the electronic device.

* * * * *

UNITED STATES PATENT AND TRADEMARK OFFICE
CERTIFICATE OF CORRECTION

| | | |
|---|---|---|
| PATENT NO. | : 8,474,029 B2 | |
| APPLICATION NO. | : 13/423966 | |
| DATED | : June 25, 2013 | |
| INVENTOR(S) | : Neil Patrick Adams et al. | |

It is certified that error appears in the above-identified patent and that said Letters Patent is hereby corrected as shown below:

In the Claims:

Column 23 Lines 26-27 should recite "to provide access only to one or more low-security functions of the electronic device"

Signed and Sealed this
Sixth Day of August, 2013

Teresa Stanek Rea
*Acting Director of the United States Patent and Trademark Office*